United States Patent [19]
Bell

[11] 3,858,668
[45] Jan. 7, 1975

[54] STOP ARRANGEMENT FOR DRILL TURBINES
[75] Inventor: Jean Bell, La Tronche, France
[73] Assignee: Societe Generale de Constuctions Electrique et Mecaniques (ALSTHOM), Paris, France
[22] Filed: Oct. 16, 1972
[21] Appl. No.: 297,840

[30] Foreign Application Priority Data
Oct. 15, 1971 France .............................. 71.37947

[52] U.S. Cl. .................. 175/107, 188/71.5, 188/83, 188/166, 308/162, 415/123, 415/503
[51] Int. Cl. ............................................. E21b 3/12
[58] Field of Search ....... 188/71.3, 71.4, 73.2, 71.1, 188/71.5, 72.1, 83, 130, 218 XL, 218 A, 166; 192/70.17, 107 C, 107 R; 64/30 R; 415/123, 503, 55; 175/107; 308/161, 162

[56] References Cited
UNITED STATES PATENTS
| | | | |
|---|---|---|---|
| 1,862,991 | 6/1932 | Vargha | 192/107 CP X |
| 1,936,031 | 11/1933 | Ruesenberg | 188/71.4 |
| 2,095,805 | 10/1937 | Frank | 188/251 M X |
| 2,354,428 | 7/1944 | Saurer | 188/130 |
| 3,231,058 | 1/1966 | Batchelor et al. | 188/218 XL |

FOREIGN PATENTS OR APPLICATIONS
| | | | |
|---|---|---|---|
| 269,696 | 4/1927 | Great Britain | 192/107 R |
| 30,034 | 12/1910 | Great Britain | 192/107 R |

Primary Examiner—George E. A. Halvosa
Attorney, Agent, or Firm—Craig & Antonelli

[57] ABSTRACT

Stop arrangement for drill turbines in which the fixed disks and the mobile disks are made of steel, their friction surfaces being processed by conventional methods in order to impart thereto a suitable hardness, the mobile disks being installed so as to be movable elastically in the axial direction in order to distribute the efforts among the various elements and in order to damp the shocks between the rigid friction surfaces of the said elements.

2 Claims, 5 Drawing Figures

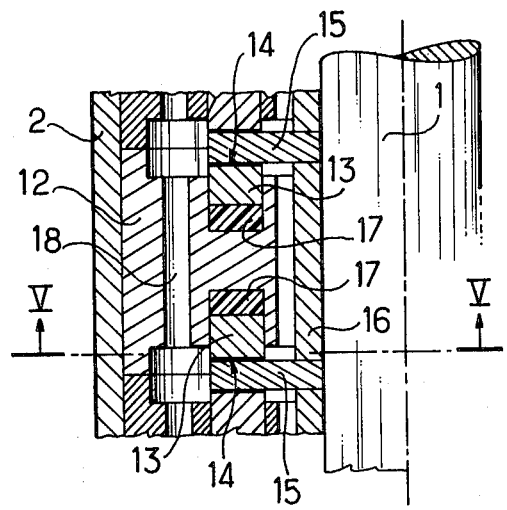
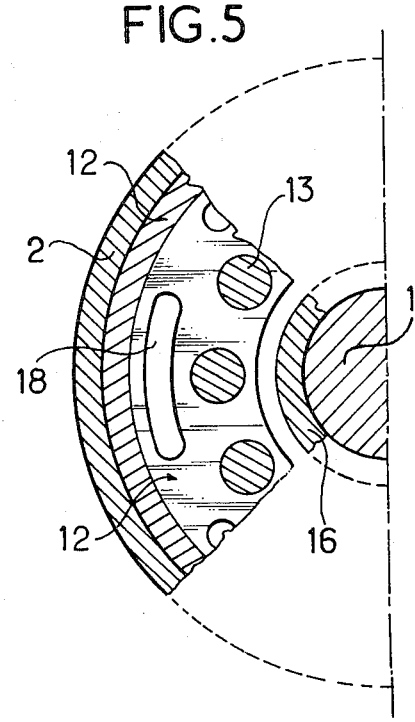

STOP ARRANGEMENT FOR DRILL TURBINES

Turbine drills must be equipped with stops transmitting considerable longitudinal stresses between the rotating shaft and the body of the turbine drill. Usually, multi-stage stops are employed, comprising a set of mobile friction elements known as "mobile disks," assembled on the shaft; the faces of the mobile disks rub against the cooperating faces of a set of fixed friction elements known as "fixed disks" installed in the body of the turbine drill. In current practice, mobile disks are made of steel whose friction surfaces are treated so as to have suitable hardness, whereas the friction surfaces of the fixed disks are coated with an elastomer. The disadvantage of that practice is a relatively fast wear of the stops, more often of the mobile disks, more particularly, and, sometimes, too, of the elastomer on the fixed disks. Another disadvantage is the alteration of the mechanical properties and, in certain cases, damage to the elastomer coating because of the high temperatures encountered in wells being drilled.

The present invention aims at overcoming these disadvantages.

The stop arrangement according to the invention, comprising a set of fixed elements and a set of mobile elements, is characterized in that the set of fixed elements and the set of mobile elements are made of steel, their friction surfaces being treated by conventional methods in order to give them suitable hardness, the friction surfaces of one of the sets of elements being movably and flexibly installed in the axial direction in order to distribute the stresses among the various elements and in order to damp the shocks between the rigid friction surfaces of the said elements.

In a first variant of the invention, the sets of fixed and mobile elements consist of disks, resilient annular elements being inserted between the non-friction parts of the mobile disks.

In another variant of the invention, the set of mobile elements consists of steel mobile disks whose two faces with the set of fixed elements constitute the friction surfaces and the said set of fixed elements is constituted by steel fixed disks comprising blind drilled portion at the end of which are inserted pins made of an elastomer, surmounted by steel pins resting with one end on the said pins made of an elastomer, whose other end, extending beyond the surface of the fixed disk, ensures the contact with the friction surface of the adjacent mobile disk.

The elastic elements may be, for example, spring washers of the type known as "disk washers" or washers made from an elastomer.

In order to make it possible to understand the invention thoroughly, two embodiments, given by way of an example, will now be described with reference to the accompanying figures.

FIG. 4 is a partial axial sectional view of another version of the stop according to the invention; and FIG. 5 is a partial sectional view along the plan V—V in FIG. 4.

Figure 1:
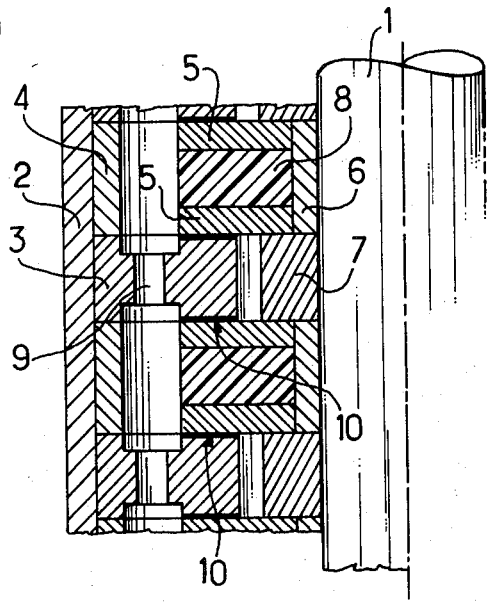
FIG. 1 is a partial axial sectional view of a stop according to the invention for a turbine drill.

FIG. 1 shows a stop for a turbine drill constituted by steel fixed disks 3, installed in the body 2 of a turbine drill where they are held tight longitudinally, with interposition of tubular spacer members 4, and steel mobile disks 5 installed as a slip fit on tubular spacer members 6 held tight on the shaft 1, thrust rings 7 being interposed.

The friction surfaces 10 of the disks 3 and the cooperating friction surfaces of the disks 5 are treated by conventional methods to give them the required hardness. In operation, the mobile disks 5 rotate with the shaft 1 and follow the longitudinal displacement thereof within the limits of the clearance between the mobile disks 5 and the adjacent fixed disks 3 so that the friction surfaces of the respective disks bear on one another.

In order to distribute the stresses among the various disks of the stop, and to damp the shocks between the rigid friction surfaces of the disks, resilient elements 8 are inserted between the mobile disks 5. These elements may consist of annular rings made of an elastomer, or metal springs, for example, steel springs called "cup springs."

Figure 2:
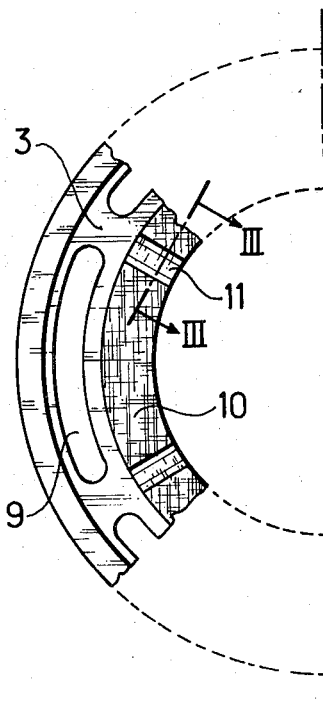
FIG. 2 is a partial plan view of a fixed disk.
Figure 3:
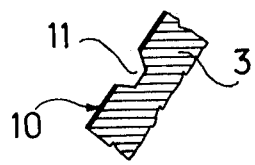
FIG. 3 is a partial sectional view along the plan III—III in FIG. 2.

FIG. 2 shows that the fixed disks 3 are provided with openings 9 for the flow of the drill fluid, and that their friction surfaces 10 are provided with grooves 11, which may be seen in a sectional view in FIG. 3.

FIGS. 4 and 5 show another version of the invention in which the fixed disks 12 installed in the body 2 of the turbine drill are provided, on each of their two faces, with blind drilled portions in which steel pins 13 are accommodated. The end faces 14 of these pins which rub against the faces of the mobile disks 15 installed on the shaft 1 by means of spacer members 16, are treated to give them suitable hardness, and flexible elements 17, for example pins made of an elastomer or metal springs, are accommodated at the bottom of the drilled portions.

These flexible elements transmit the longitudinal stresses among the pins 13 and the mobile disks 15 as in the case of the previous example, damping the shocks between the friction surfaces and distributing the longitudinal stresses among the stages of the stop.

The fixed disks are provided with openings 18 for the passage of the drilling fluid, analogous to the openings 9 of the disks 3 in the previous example.

The arrangement according to FIGS. 4 and 5 has the advantage of enabling only the pins 13, which are parts having small dimensions and being relatively cheap, to be replaced, instead of having to replace the whole fixed disks 12 after wear.

What is claimed is:

1. A stop arrangement for turbine drills comprising: a turbine drill body, a turbine drill, a shaft for driving the drill, a plurality of fixed friction elements mounted on the body of said turbine drill, means for maintaining a predetermined distance between said fixed friction elements, a plurality of mobile friction elements mounted on the drill shaft, the faces of the elements in the axial direction of the drill shaft in one of said plurality of friction elements being positioned as friction parts on the cooperating faces of the adjacent elements of the other of said plurality of friction elements, characterized in that each element of said plurality of fixed friction elements is rigidly mounted and provided with at least two friction surfaces spaced in the axial direction of the drill shaft, each element of said plurality of mobile elements being provided with only one friction surface cooperating with one of said at least two friction surfaces of said fixed friction elements, means for distributing the stresses from one friction surface of all rigidly mounted elements to the cooperating friction surfaces of the associated elements and for damping the shocks between the rigid surfaces of said elements, said last mentioned means including resilient annular elements disposed between adjacent elements of said plurality of mobile elements for movably and resiliently mounting the friction surfaces thereof in the axial direction of the drill shaft said plurality of fixed friction elements and said plurality of mobile friction elements consisting of steel discs with the friction surfaces thereof treated to give an appropriate hardness, and means provided in said plurality of fixed friction elements for permitting the flow of fluid to the turbine drill.

2. A stop arrangement for turbine drills comprising: a turbine drill body, a turbine drill, a shaft for driving the drill, comprising a plurality of fixed elements mounted on the body of said turbine drill, a first plurality of friction elements, a plurality of mobile friction elements mounted on the drill shaft, the faces of the friction elements in the axial direction of the shaft of said first plurality of friction elements being positioned on friction parts on the cooperating faces of the adjacent elements of the other plurality of friction elements, characterized in that each element of said plurality of mobile friction elements is provided with at least two friction surfaces spaced in the axial direction of the drill shaft, said first plurality of friction elements including steel pin means provided with only one friction surface cooperating with one of said at least two friction surfaces of said mobile friction elements, said steel pin means being disposed in blind drilled portions provided in said plurality of fixed elements, means for distributing the stresses from one friction surface to the cooperating friction surfaces of the associated elements and for damping shocks between the friction surfaces, said last mentioned means including resilient elements disposed between the non-friction end of said steel pin and the bottom of said blind drilled portion for movably and resiliently mounting the friction surfaces of said mobile friction elements in the axial direction of the drill shaft, and means provided in said fixed elements for permitting the flow of fluid to the turbine drill.

* * * * *